(12) United States Patent
Ogawa et al.

(10) Patent No.: US 8,992,376 B2
(45) Date of Patent: Mar. 31, 2015

(54) POWER TRANSMISSION DEVICE

(75) Inventors: Hiroyuki Ogawa, Susono (JP); Akira Murakami, Gotenba (JP); Daisuke Tomomatsu, Susono (JP); Takahiro Shiina, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 325 days.

(21) Appl. No.: 13/580,561

(22) PCT Filed: Feb. 22, 2010

(86) PCT No.: PCT/JP2010/052645
§ 371 (c)(1),
(2), (4) Date: Aug. 22, 2012

(87) PCT Pub. No.: WO2011/101991
PCT Pub. Date: Aug. 25, 2011

(65) Prior Publication Data
US 2012/0322609 A1      Dec. 20, 2012

(51) Int. Cl.
*F16H 15/52*     (2006.01)

(52) U.S. Cl.
CPC ...................................... *F16H 15/52* (2013.01)
USPC .......................................................... 476/38

(58) Field of Classification Search
USPC ........................... 476/36, 38, 40, 46; 475/189
See application file for complete search history.

(56) References Cited

U.S. PATENT DOCUMENTS

| 2,883,883 | A | * | 4/1959 | Chillson | 475/189 |
| 2,903,897 | A | * | 9/1959 | Whalen | 476/44 |
| 6,241,636 | B1 | * | 6/2001 | Miller | 476/38 |

FOREIGN PATENT DOCUMENTS

| DE | 498701 | 5/1930 |
| JP | 2008 69979 | 3/2008 |
| WO | 2010 092661 | 8/2010 |
| WO | 2010 122634 | 10/2010 |

OTHER PUBLICATIONS

International Search Report Issued May 25, 2010 in PCT/JP10/52645 Filed Feb. 22, 2010.

* cited by examiner

*Primary Examiner* — William C Joyce
(74) *Attorney, Agent, or Firm* — Oblon, McClelland, Maier & Neustadt, L.L.P.

(57) ABSTRACT

A power transmission device includes first and second rings arranged opposite each other, having a common rotation center axis, and rotatable relative to each other; a plurality of planetary balls having rotation center axes parallel to the rotation center axis, and radially arranged between the first and second rings and around the rotation center axis; a transmission control unit configured to change a rotation ratio between the first and second rings by changing the respective contact points of the first and second rings and each of the planetary balls through tilting motion of each of the planetary balls; and a rotation restricting unit disposed between the planetary balls adjacent to each other.

3 Claims, 7 Drawing Sheets

POWER TRANSMISSION DEVICE

FIELD

The present invention relates to a power transmission device capable of changing rotational speed (the number of revolutions) between an input and an output.

BACKGROUND

Conventionally, power transmission devices are known to change an input-to-output rotational (the number of revolutions) ratio, that is, a transmission ratio. Among the power transmission devices is a continuously variable transmission for continuously variably changing a transmission ratio, such as one composed of a so-called traction planetary gear mechanism that includes a plurality of rotating elements. An example of a traction planetary gear mechanism includes: first to fourth rotating elements which can rotate relative to one another with a common rotation center axis; and rolling members, as a fifth rotating element, which have rotation center axes different from the common rotation center axis. The first rotating element is obtained by molding in a columnar or cylindrical form, and functions as a sun roller. A plurality of rolling members (planetary balls) are radially arranged on the periphery of the first rotating element. The second rotating element functions as a carrier and rotates (revolves) together with the rolling members supported by the carrier around its rotation center axis. The third and fourth rotating elements are obtained by molding in an annular or disk-like form and function as ring gears in a planetary gear mechanism, and sandwich the rolling members. The rolling members rotate around their rotation center axes, in addition to their individual revolving. In a traction planetary gear mechanism of this type, torque is transmitted among the first, second, third, and fourth rotating elements via each rolling member. For example, Patent Literature 1 described below discloses a continuously variable transmission of this type. In the continuously variable transmission described in the Patent Literature 1, respective portions of planetary balls are surrounded by the annular portions of pivotal support objects, and these are integrated by extending a support shaft through them. The support shaft passes through the center of each planetary ball. Each pivotal support object is supported by the carrier by fitting a notch thereof on a pin extending from the carrier. Thus, each planetary ball revolves integrally with the carrier. In the continuously variable transmission described in the Patent Literature 1, adjacent planetary balls are connected by a thin rod-like member both ends of which are fitted into the annular portions of the pivotal support objects.

CITATION LIST

Patent Literature

Patent Literature 1: Japanese Patent Application Laid-open No. 2008-069979

SUMMARY

Technical Problem

However, in the conventional continuously variable transmission described above, where the rotational speed (the number of revolutions) is different between the third and fourth rotating elements, that is, where torque is different between them, forces in opposite directions are generated in the respective contact areas of the third and fourth rotating elements and each rolling member (planetary ball). Since each contact area is offset from the position of the center of gravity of the rolling member toward the direction of the rotation center axis of the rolling member, each of the forces causes the rolling member to generate spin moment, which may lead to displacement of the rotation center axis of the rolling member in the moment direction. If displacement occurs due to this, a required state of being parallel between the rotation center axis of the rolling member and the rotation center axis of the first rotating element (sun roller) is lost, such that skew may occur between the rolling member and first rotating element. Consequently, in the continuously variable transmission in this state, thrust force occurs between the rolling member and first rotating element, and the thrust force is scattered in the form of heat, resulting in decrease in torque transmission efficiency. Additionally, in the continuously variable transmission described in the Patent Literature 1, although adjacent planetary balls are connected by a thin rod-like member, spin moment generated in each planetary ball cannot be nullified by these members.

It is accordingly an object of the present invention to provide a power transmission device capable of restricting decrease in torque transmission efficiency by overcoming the drawbacks of such a conventional example.

Solution to Problem

In order to achieve the above mentioned object, a power transmission device according to the present invention includes two rotating elements arranged opposite each other, having a common rotation center axis, and rotatable relative to each other; a plurality of rolling members having rotation center axes parallel to and different from the rotation center axis, and radially arranged between the rotating elements and around the rotation center axis of the rotating elements; a transmission control unit configured to change a rotation ratio between the rotating elements by changing a contact point of one of the rotating elements and each of the rolling members and a contact point of the other one of the rotating elements and each of the rolling members through tilting motion of each of the rolling members; an annular member disposed around each of the rolling members like a ring of Saturn such that when a spin moment is generated in the rolling member in directions other than the direction of rotation of the rolling member around its axis and the direction of rotation of the rolling member during tilting, the annular member is rotatable integrally with the rolling member in the direction of the spin moment; and a rotation restricting unit disposed between the annular members surrounding the rolling members adjacent to each other, and configured such that at least part of the spin moment generated in each of the rolling members is offset via the adjacent annular members, thereby restricting rotation of the rolling members generated by the spin moment.

In the power transmission device, it is preferable to further include a third rotating element capable of rotating relative to each of the rotating elements on the common rotation center axis to the two rotating elements; and a fourth rotating element capable of rotating relative to each of the rotating elements on the common rotation center axis to the three rotating elements and capable of rotating each of the rolling members around the rotation center axis of each of the rotating elements, wherein each of the rolling members is preferably arranged on the peripheral surface of the third rotating element.

Here, in the power transmission device, it is preferable that the rotation restricting unit includes a convex curved surface body arranged between the adjacent annular members, a first holding portion for the convex curved surface body and a second holding portion for the convex curved surface body, the first holding portion being provided so as to move integrally with one of the rolling members and the second holding portion being provided so as to move integrally with the other one of the rolling members, and the first holding portion and the second holding portion respectively preferably have concave curved surfaces, between which the convex curved surface body is sandwiched so as to be freely moved along both the curved surfaces.

Further, in the power transmission device, it is preferable that the rotation restricting unit includes a convex curved surface portion provided so as to move integrally with one of the adjacent annular members, and a concave curved surface portion provided so as to move integrally with the other one of the rolling members and having a concave curved surface engaged with a convex curved surface of the convex curved surface portion such that the convex curved surface of the convex curved surface portion is freely movable along the curved surface.

Further, in the power transmission device, it is preferable that the rotation restricting unit is a universal joint including a first engagement portion provided so as to move integrally with one of the adjacent annular members, a second engagement portion provided so as to move integrally with the other one of the annular members, and a coupling portion provided to freely change a joint angle between the first engagement portion and the second engagement portion.

Advantageous Effects of the Invention

The power transmission device according to the present invention uses its rotation restricting units such that even when spin moment is generated in each rolling member, force generated by its spin moment is nullified by the force generated by the spin moment of the adjacent rolling member, and at least part of each spin moment is offset. Consequently, rotation by spin moment is restricted in each rolling member. As a result, in the power transmission device, since occurrence of thrust force between each rotating element and the rolling members is restricted, any decrease in torque transmission efficiency can be restricted.

DESCRIPTION OF EMBODIMENTS

Embodiments of a power transmission device according to the present invention will be described in detail with reference to the drawings. It should be noted that the present invention is not limited to these embodiments.

First Embodiment

A first embodiment of a power transmission device according to the present invention will be described based on FIGS. 1 to 6. Here, a description is given using a continuously variable transmission as an example of a power transmission device.

Figure 1:
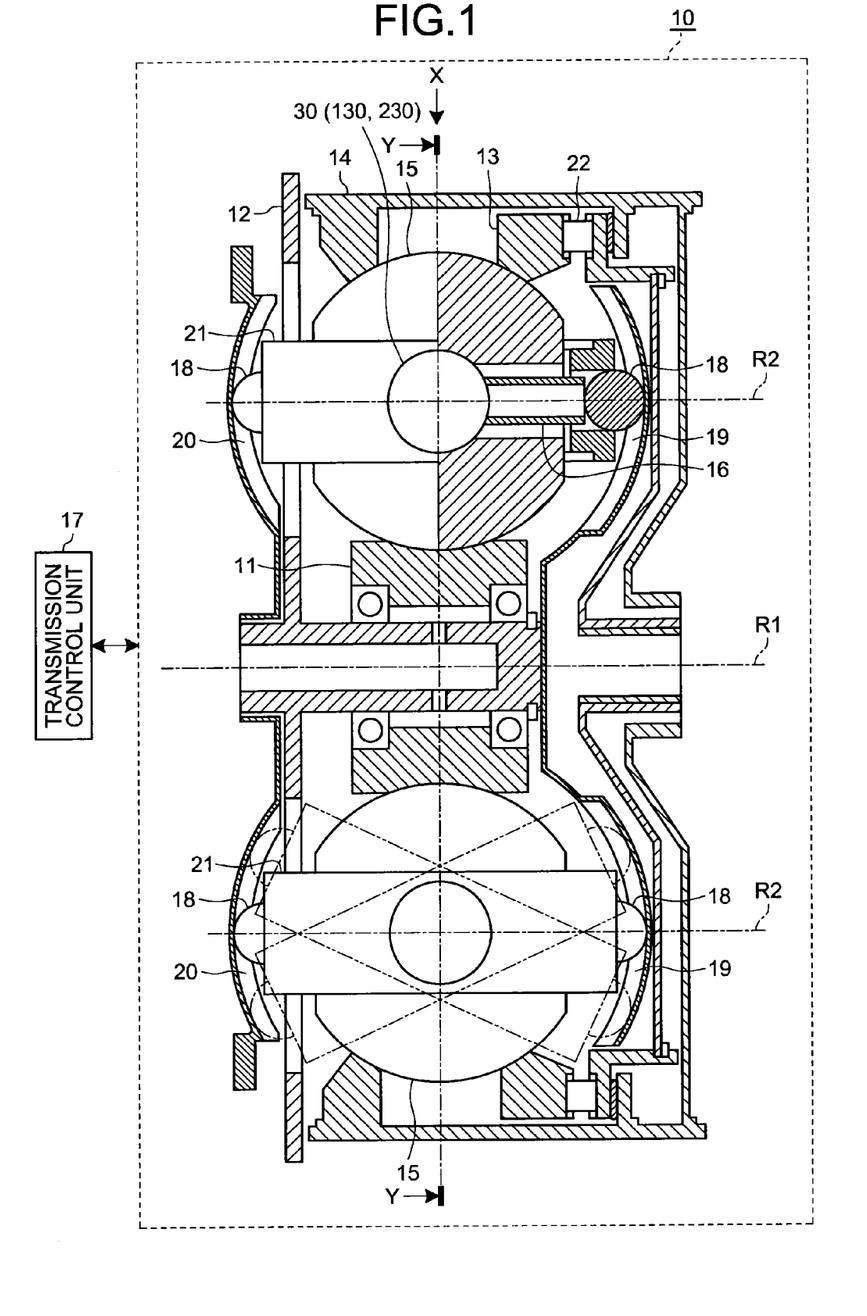
FIG. 1 is a partial cross-sectional view illustrating a continuously variable transmission that is an example of a power transmission device according to the present invention.

First, an example of the continuously variable transmission of the first embodiment will be described using FIG. 1. Symbol 10 in FIG. 1 represents the continuously variable transmission in the first embodiment. This continuously variable transmission 10 has a continuously variable transmission mechanism composing a transmitting section.

The continuously variable transmission mechanism is a so-called traction planetary gear mechanism having first to fourth rotating elements 11 to 14 with a common rotation center axis R1, which are able to rotate relative to one another, and having a plurality of fifth rotating elements 15 with rotation center axes R2 different from the rotation center axis R1. In this continuously variable transmission 10, torque is transmitted among the first, second, third, and fourth rotating elements 11, 12, 13, and 14 via the fifth rotating elements 15. In the description below, the direction along the rotation center axes R1 and R2 is referred to as axial direction and the direction around the rotation center axis R1 is referred to as circumferential direction, unless otherwise specified in particular. In addition, directions orthogonal to the rotation center axis R1 are referred to as radial directions, among which, the inward and outward sides are referred to as the radially inward and radially outward sides respectively. The first to fifth rotating elements 11 to 15 are composed so as not to move relative to one another in axial direction.

In this continuously variable transmission 10, at least one of the first to fourth rotating elements 11 to 14 serves as a torque input portion, and at least one of the remaining rotating elements serves as a torque output portion. Therefore, in this continuously variable transmission 10, the ratio of the rotational speed (i.e., the number of revolutions) of any rotating element serving as input portion to that of any rotating element serving as output portion is a transmission ratio. For example, the continuously variable transmission 10 is disposed on the power transmission path of a vehicle. In this case, the input portion is connected to the power source side such as an engine or motor, and its output portion is connected to the corresponding drive wheel side.

Here, in this continuously variable transmission 10, the first rotating element 11 functions as a sun roller for a traction planetary gear mechanism, and a second rotating element 12 functions as a carrier. Each of the third rotating elements 13 and fourth rotating element 14 functions as an ring gear in a planetary gear mechanism. Each fifth rotating element 15 functions as a ball type pinion in the traction planetary gear mechanism. Each of theses fifth rotating elements 15 rotates around its rotation center axis R2, and also revolves around the rotation center axis R1. In the description below, the first rotating element 11 and the second rotating element 12 are referred to as "a sun roller 11" and "a carrier 12" respectively. In addition, the third and fourth rotating elements 13 and 14 are referred to as "a first ring 13" and "a second ring 14" respectively, and each fifth rotating element 15 is referred to as "a planetary ball 15."

The sun roller 11 is obtained by molding in a columnar or cylindrical shape with the rotation center axis R1 as its rotation axis. On the peripheral surface of this sun roller 11, the plurality of planetary balls 15 are radially arranged substantially at regular intervals. Therefore, in this sun roller 11, the peripheral surface serves as a rolling face on which each planetary ball 15 rotates around its axis. There is a case where this sun roller 11 rotates each planetary ball 15 by virtue of its own rotating motion of the sun roller 11, and a case where the sun roller 11 rotates by virtue of the rolling motion of each planetary ball 15 (the rotating motion of it around itself).

The planetary balls 15 will now be described in detail. Each planetary ball 15 is a rolling member that rolls on the peripheral surface of the sun roller 11. It is preferable that this planetary ball 15 be a perfectly spherical ball. However, it may be one that has a spherical shape at least in a rolling direction, such as one with an elliptic cross-section like a rugby ball. This planetary ball 15 is freely rotatably supported by a support shaft 16 extending through the center of the planetary ball 15. For example, the planetary ball 15 is configured such that using a bearing (not shown) disposed between this planetary ball 15 and the peripheral surface of the support shaft 16, the planetary ball 15 is able to rotate relative to the support shaft 16 that uses the rotation center axis R2 as the support shaft's own rotation axis (that is, the planetary ball 15 is able to rotate around its axis). Therefore, this planetary ball 15 is able to roll on the peripheral surface of the sun roller 11 around the support shaft 16.

This support shaft 16 is disposed on a plane where the rotation center axis R2 includes the rotation center axis R1. A reference position for this support shaft 16 is a position where the rotation center axis R2 is parallel to the rotation center axis R1, as indicated by the solid line in FIG. 1. Within the plane, this support shaft 16 is able to swing (tilt) together with the planetary ball 15 between the reference position and the position slanting from the reference position. The tilting takes place around the center of the planetary ball 15 within the plane.

This continuously variable transmission 10 is provided with a transmission control unit 17 that allows the transmission operation of the continuously variable transmission mechanism by tilting each planetary ball 15. As with the one described in the Patent Literature 1 referred to above for example, the transmission control unit 17 is configured such that axially reciprocating force can be applied to an annular member 21 (described below), at a position that is moved from the center of the annular member 21 toward the radially inward side. This transmission control unit 17 causes tilting force to act on the annular member 21 and the planetary ball 15, thereby tilting them around the planetary ball 15 within the plane. A reference position for tilting angle of the planetary ball 15 in FIG. 1 is assumed to be 0 degrees. This transmission control unit 17 includes a driving unit, examples of which are an electric actuator, such as an electric motor, and a hydraulic actuator, and also includes an electronic control unit (ECU) for controlling this driving unit. This transmission control unit 17 controls the tilting angle by adjusting the reciprocal force applied to the annular member 21 by the driving unit.

Here, the foregoing transmission control unit 17 may include for example: tilting arms, one end of each of which is attached to the corresponding end of the support shaft 16 projecting from the planetary ball 15 and the other end of each of which is disposed on the rotation center axis R1 side; and a driving unit for moving the pair of tilting arms, examples of which are an electric actuator, such as an electric motor, and a hydraulic actuator. In this transmission control unit 17, the driving unit moves the tilting arms in their longitudinal directions and in opposite directions to each other along the plane, thereby causing tilting force to act on the support shaft 16 and the planetary ball 15. Consequently, the transmission control unit 17 slants the support shaft 16 and tilts the corresponding planetary ball 15 in conjunction with this. The operation of the driving unit is controlled by the electronic control unit (ECU). The tilting arms are radially arranged around the rotation center axis R1 and are accommodated in grooves in the carrier 12, which are formed radially like the arms.

Figure 2:
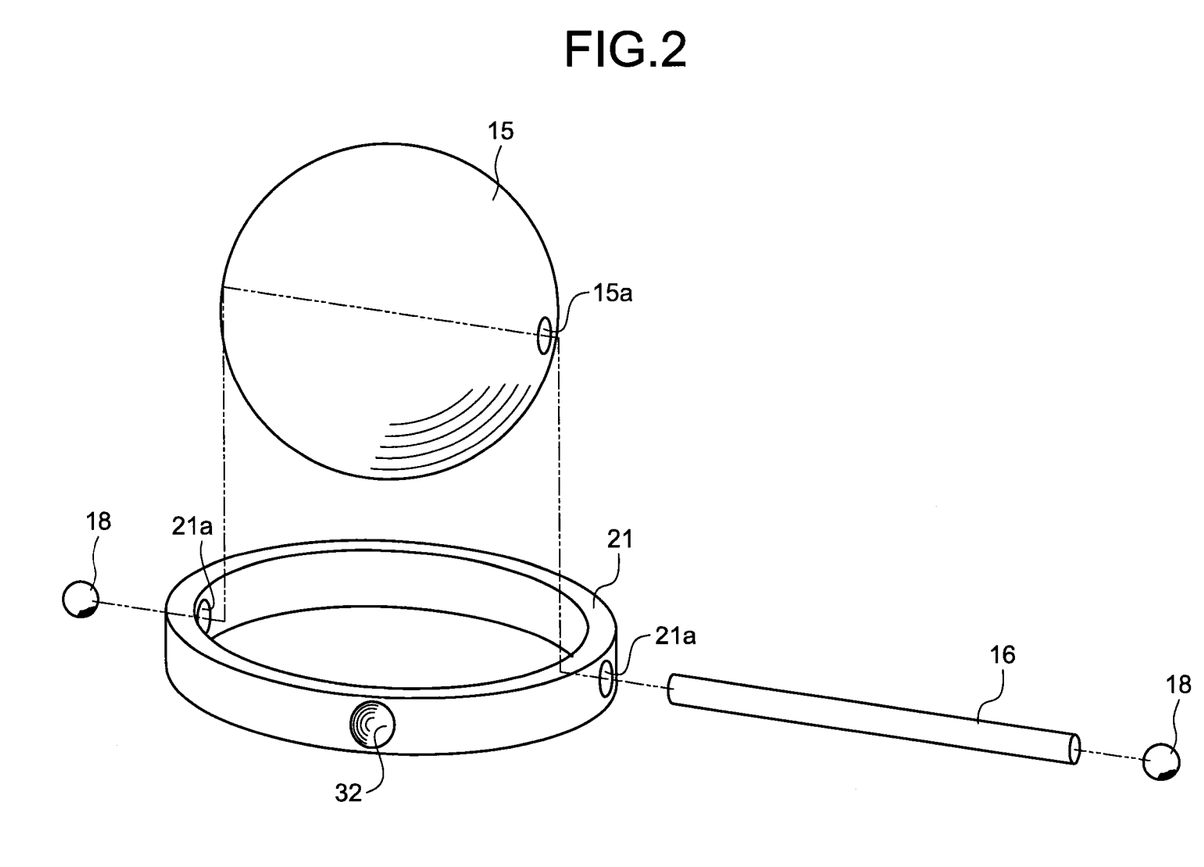
FIG. 2 is a perspective view illustrating a state before a planetary ball, annular member, and so on are fitted together.
Figure 3:
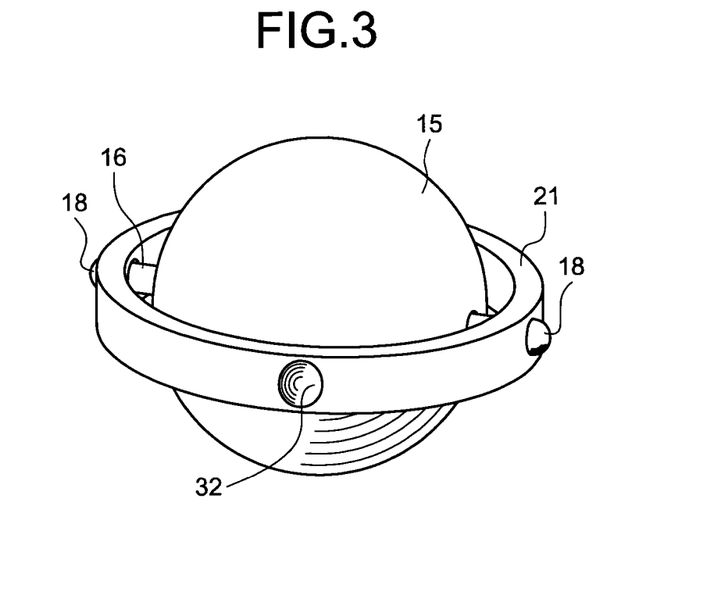
FIG. 3 is a perspective view illustrating a state after the planetary ball, annular member, and so on are fitted together.

In this example, both ends of the support shaft 16 are projected out from the planetary ball 15, and guide members 18 for guiding tilting in a correct direction are provided at both ends. Each of the guide members 18 is, for example, a guide ball formed from a body with a convex curved surface body such as a spherical body. These guide members 18 move integrally with the planetary ball 15 and the support shaft 16 when tilting takes place. As shown in FIGS. 2 and 3, part of each planetary ball 15 in the first embodiment is surrounded by a corresponding annular member 21 that has an annular portion like a ring of Saturn. The annular member 21 is disposed such that the center of the annular portion coincides with the center of gravity of the planetary ball 15 and such that equal distance is left from the part of the peripheral surface of the planetary ball 15. This annular member 21 has a through-hole 21a in each of two areas of the annular portion, which areas are respectively opposite the through-holes 15a of the planetary ball 15, in which the support shaft 16 is inserted. With regard to each through-hole 21a, while one end of the support shaft 16 is inserted in the radially inward portion of the annular portion, part of the guide member 18 is inserted in the radially outward portion thereof. The annular member 21 and the support shaft 16 are configured so as to be able to rotate relative to each other around the rotation center axis R2 as their respective rotation axes via, for example, a bearing (not shown). Conversely, the annular member 21 and the guide member 18 are fitted together so as to be moved integrally.

Additionally, the continuously variable transmission 10 is provided with first and second guide portions 19 and 20, each of which guides along the above-mentioned plane the corresponding guide member 18 (a portion projecting from the annular member 21, in this case), which moves with the tilting of the planetary ball 15. Each of the first and second guide portions 19 and 20 may be, for example, one with a groove-like shape matching the shape of the guide member 18, or one that guides the guide member 18 by using two opposite wall surfaces or the like. The first and second guide portions 19 and 20 rotate around the rotation center axis R1 as their rotation axes and integrally with the carrier 12. At this time, the first and second guide portions 19 and 20 press their respective wall surfaces against the corresponding guide members 18 provided at both the respective ends of the support shaft 16. Accordingly, each planetary ball 15 rotates (revolves) around the rotation center axis R1 and integrally with the carrier 12.

The carrier 12 is a rotating member which may rotate relative to the sun roller 11 and the first and second rings 13 and 14 around the rotation center axis R1 as its rotation axis. This carrier 12 has at least one disk portion that uses the rotation center axis R1 as its rotation axis. To show the carrier 12 as an example, it is disposed on the second guide portion 20 side.

Each of the first and second rings 13 and 14 is a rotating member obtained by molding in the shape of a circular ring with the rotation center axis R1 as its rotation axis. The first and second rings 13 and 14 are disposed opposite each other in the axial direction so as to sandwich the planetary balls 15 between them. Specifically, each of the first and second rings 13 and 14 has a contact face, which is in contact with the radially outward side of the external curved surface of each planetary ball 15. The contact face of each ring has an inward arcuate face identical in curvature to the external curved surface of the planetary ball 15. Here, the contact faces are formed such that the distances from the rotation center axis R1 to the respective contact areas of these first and second rings 13 and 14 and the planetary ball 15 are equal. Thereby, the respective contact angles of the first and second rings 13 and 14 to the planetary ball 15 are made equal. The contact angle refers to the angle from the reference to the contact area of each of the first and second rings 13 and 14 and the planetary ball 15. Here, a radial direction is used as reference. In the respective contact faces, the first and second rings 13 and 14 are in point-contact or line-contact with the external curved surface of the planetary ball 15. The direction of the line-contact is orthogonal to the above-mentioned plane as defined when the planetary ball 15 tilts. Additionally, the contact faces are formed such that when axial forces in the direction of the planetary ball 15 are respectively applied to the first and second rings 13 and 14, radially inward, oblique force is applied to the planetary ball 15.

In the continuously variable transmission 10, when the tilting angle of each planetary ball 15 is 0 degrees, the first and second rings 13 and 14 rotate at the same rotational speed (with the same number of revolutions). Specifically, at this time, the rotation ratio (i.e., the ratio of rotational speed or the number of revolutions) of the first ring 13 to the second ring 14 is 1. Conversely, when each planetary ball 15 is tilted away from the reference position, the contact area (contact point) of this planetary ball 15 and the first ring 13 and the contact area (contact point) of this planetary ball 15 and the second ring 14 change, so that the distance from the central axis of the support shaft 16 to the contact area of the planetary ball 15 and the first ring 13 changes, and also the distance from the central axis of the support shaft 16 to the contact area of the planetary ball 15 and the second ring 14 changes. As a result, the first ring 13 or the second ring 14 rotates at a high speed and the other rotates at a low speed as compared to where each is in the reference position. For example, when the planetary ball 15 is tilted in one direction, the second ring 14 rotates at a speed lower than the first ring 13 (yielding an increase in speed) and conversely when it is tilted in the other direction, it is rotated at a speed higher than the first ring 13 (yielding a decrease in speed). Accordingly, in the continuously variable transmission 10, the ratio of rotation of the first ring 13 to the second ring 14 can be continuously and variably changed by altering the tilting angle of the planetary ball 15. Here, to increase speed, the upper planetary ball 15 and the lower planetary ball 15 in FIG. 1 are tilted clockwise and counterclockwise respectively as viewed in the drawing. Conversely, to decrease speed, the upper planetary ball 15 and the lower planetary ball 15 in FIG. 1 are tilted counterclockwise and clockwise respectively as viewed in the drawing.

This continuously variable transmission 10 is provided with a pressurizing portion (not shown), which causes at least one of the first and second rings 13 and 14 to be pressed against each planetary ball 15, thereby generating sandwiching force between the first and second rings 13 and 14 and each planetary ball 15. The pressurizing portion generates axial force (pressing force), thereby producing a sandwiching force between them. A magnitude of the pressing force is set so as to be sufficient to maintain torque transmission among the sun roller 11, the first ring 13, and the second ring 14 via each planetary ball 15. For example, this pressurizing portion may be a drive source such as an electric actuator or hydraulic actuator or may be a mechanism such as a torque cam that generates pressing force as the disposed first ring 13 or second ring 14 rotates. In the first embodiment, the torque cam 22 mentioned in the latter is disposed. In this continuously variable transmission 10, the pressurizing portion is operated to generate pressing force, thereby producing sandwiching force between the first and second rings 13 and 14 and each planetary ball 15, and frictional force is generated between them.

In the continuously variable transmission 10, as the sun roller 11 rotates, each planetary ball 15 is rolled by frictional force, and rotating torque generated by the rotation of each planetary ball 15 around its axis is transmitted to the first and second rings 13 and 14, thereby rotating these rings. At this time, the carrier 12 rotates around the rotation center axis R1 together with each planetary ball 15. Additionally, in the continuously variable transmission 10, rotating torque generated by the rotation of each planetary ball 15 around its axis, resulting from rotation of the first ring 13, is transmitted to the sun roller 11 and the second ring 14, thereby rotating them. Also, in the continuously variable transmission 10, rotating torque generated by rotation of each planetary ball 15 around its axis, resulting from rotation of the second ring 14, is transmitted to the sun roller 11 and the first ring 13, thereby rotating them. Furthermore, in the continuously variable transmission 10, in conjunction with the rotation of the carrier 12, each planetary ball 15 rotates around its axis while revolving, so that rotating torque generated by the rotation of the planetary ball 15 around its axis is transmitted to the sun roller 11 and the first and second rings 13 and 14, thereby rotating them.

As the third and fourth rotating elements 13 and 14, disk-like rotating members having the same contact faces as the first and second rings 13 and 14 and having the rotation center axis R1 as their rotation axes may be employed instead of the circular first and second rings 13 and 14 described above.

Figure 4:
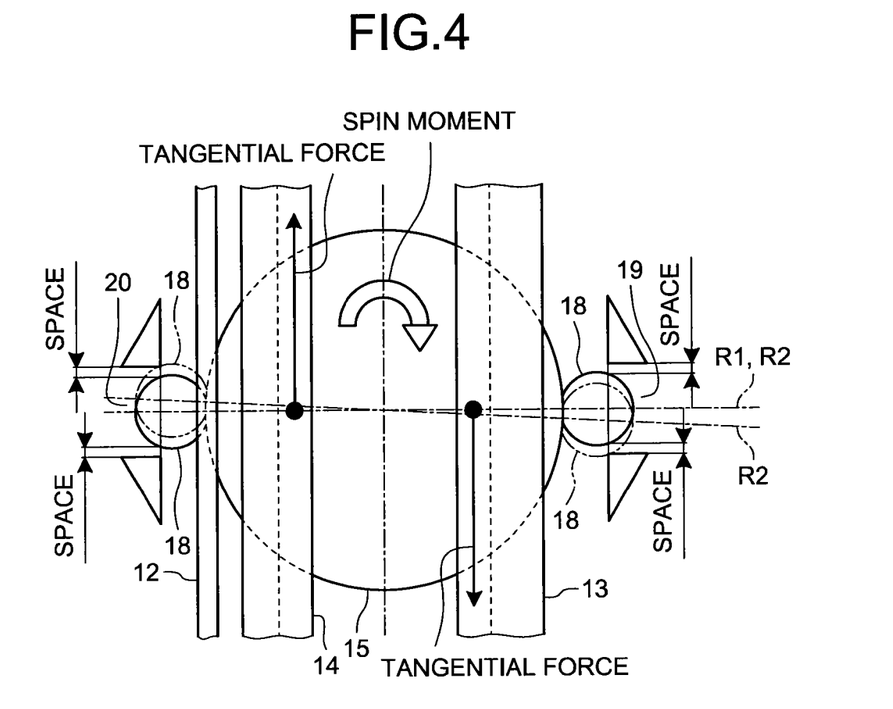
FIG. 4 is a conceptual diagram as viewed from the direction of arrow X in FIG. 1 and illustrating only essential portions.

Incidentally, in the continuously variable transmission 10, there is a case where the first and second rings 13 and 14 rotate at different rotational speeds (with a different number of revolutions), as described above. In that case, forces in opposite directions to each other occur in their respective contact areas of the first and second rings 13 and 14 and each planetary ball 15 (FIG. 4). Each force is force in a tangential direction (tangential force) in the corresponding contact area resulting from the rotations of the first ring 13, the second ring 14, and the planetary ball 15. For example, where the first ring 13 and the second ring 14 are assumed on the input side and the output side respectively, tangential force in the contact area of the planetary ball 15 and the first ring 13 acts along the direction of rotation of the first ring 13, whereas tangential force in the contact area of the planetary ball 15 and the second ring 14 acts in a direction opposite to that of rotation of the second ring 14. Here, the respective contact areas of the first and second rings 13 and 14 and the planetary ball 15 are provided in locations on the periphery of the planetary ball 15 offset by a predetermined amount from the center of gravity of the planetary ball 15 toward the rotation center axis R2. Consequently, each tangential force causes the planetary ball 15 to generate spin moment. In the planetary ball 15 as an example, spin moment around the center of gravity is generated. The spin moment acts in the direction of rotation, which is different from the direction of rotation of the planetary ball 15 around its axis and also different from the direction of rotation of the planetary ball 15 occurring during tilting. Also, the planetary ball 15 is able to move integrally with the annular member 21 via the bearing between the planetary ball 15 and the support shaft 16, via the support shaft 16, and via the bearing between the support shaft 16 and the annular member 21. Accordingly, spin moment generated in the planetary ball 15 is transmitted to the annular member 21 via them as well. FIG. 4 is a drawing as viewed from the direction of arrow X in FIG. 1 and is a conceptual diagram illustrating only essential portions, for illustrative convenience.

Here, the continuously variable transmission 10 is provided with the guide members 18 and the first and second guide portions 19 and 20 for guiding the tilting motion of the planetary ball 15, as described above. In order to smoothly guide the tilting motion of the planetary ball 15 without causing the planetary ball 15 to become stuck, for example, spaces, as shown in FIG. 4, are provided between the first and second guide portions 19 and 20 and the corresponding guide members 18. In addition, where the transmission control unit 17 uses, for example, the tilting arms described above, space for smooth guidance is defined between each arm and the carrier 12. The spaces in these guide portions contribute to factors in rotating the planetary ball 15 in directions other than the direction of rotation of the planetary ball 15 around its axis or the direction in which it tilts. When the spin moment described above is generated, these spaces may allow the planetary ball 15 to rotate in the direction of moment (for example, each guide member 18 is displaced from the position indicated by the solid line to the position indicated by the two-dot chain line in FIG. 4).

As a result, the rotation center axis R2 of the planetary ball 15 becomes parallel to the rotation center axis R1 when spin moment is not generated. However, when spin moment is generated, the rotation center axis R2 is displaced in the direction of moment with respect to the rotation center axis R1. That is, at the time of spin moment generation, the state of being parallel between the rotation center axis R1 of the sun roller 11 and the rotation center axis R2 of the planetary ball 15 is lost, resulting in displacement of the rotation center axis R2 from the plane described above. As a result, when spin moment is generated, skew may occur between the sun roller 11 and the planetary ball 15 due to the spaces, mentioned above, and due to spin moment. In other words, the sun roller 11 and the planetary ball 15 work in a manner similar to a skew gear (helical gear). Additionally, skew may similarly occur between the first and second rings 13 and 14 and the planetary ball 15. Therefore, in the continuously variable transmission 10 when spin moment is generated, thrust forces occur between the sun roller 11 and each planetary ball 15 and between the first and second rings 13 and 14 and each planetary ball 15. The thrust forces scatter in the form of heat, and end up decreasing torque transmission efficiency. Narrowing each space makes it possible to narrow the margin for decrease in torque transmission efficiency. On the other hand, since very great force is required to cause the planetary ball 15 to generate tilting, the size of the driving unit and hence the size of the continuously variable transmission 10 increase.

Figure 5:
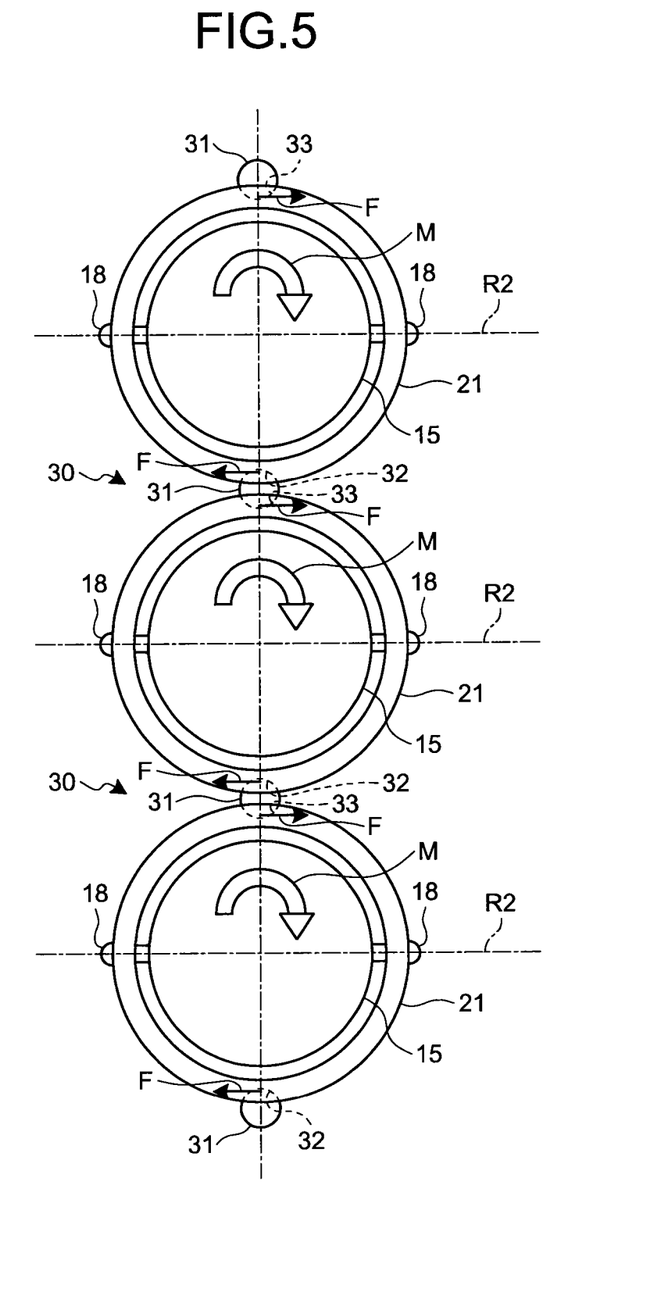
FIG. 5 is a development diagram as viewed from the direction of arrow X in FIG. 1 and illustrating only essential portions developed on the same plane.

The spin moments M in all the planetary balls 15 are generated in the same direction and at the same magnitude, and are also transmitted to the annular members 21 surrounding the corresponding planetary balls 15 as they are. FIG. 5 shows such a state and illustrates an example of the direction and magnitude of each spin moment M at a certain point in time. Therefore, in each area where adjacent planetary balls 15 are close to each other and adjacent annular members 21 are close to each other, forces F resulting from the spin moments M act in opposite directions and at the same magnitude. These forces F are transmitted to the corresponding adjacent planetary balls 15, so that the forces F are nullified by each other and the spin moments M are offset by each other. FIG. 5 is a drawing as viewed from the direction of arrow X in FIG. 1 and is a conceptual diagram illustrating only essential portions, for illustrative convenience, such as planetary balls 15, for example, adjacently arranged on the same plane.

In the first embodiment, using the spin moments M of adjacent planetary balls 15, the spin moments M (forces F) of adjacent planetary balls 15 are mutually nullified. In order to achieve this, the continuously variable transmission 10 is provided with a rotation restricting unit 30 (FIG. 5), which is configured such that at least the respective parts of the spin moments M generated in adjacent planetary balls 15 are nullified between these adjacent planetary balls 15 such that any rotations in directions different from the direction of rotation of a planetary ball 15 around its axis and the direction of tilting are restricted. The rotation restricting unit 30 is disposed between each of the adjacent planetary balls 15.

Figure 6:
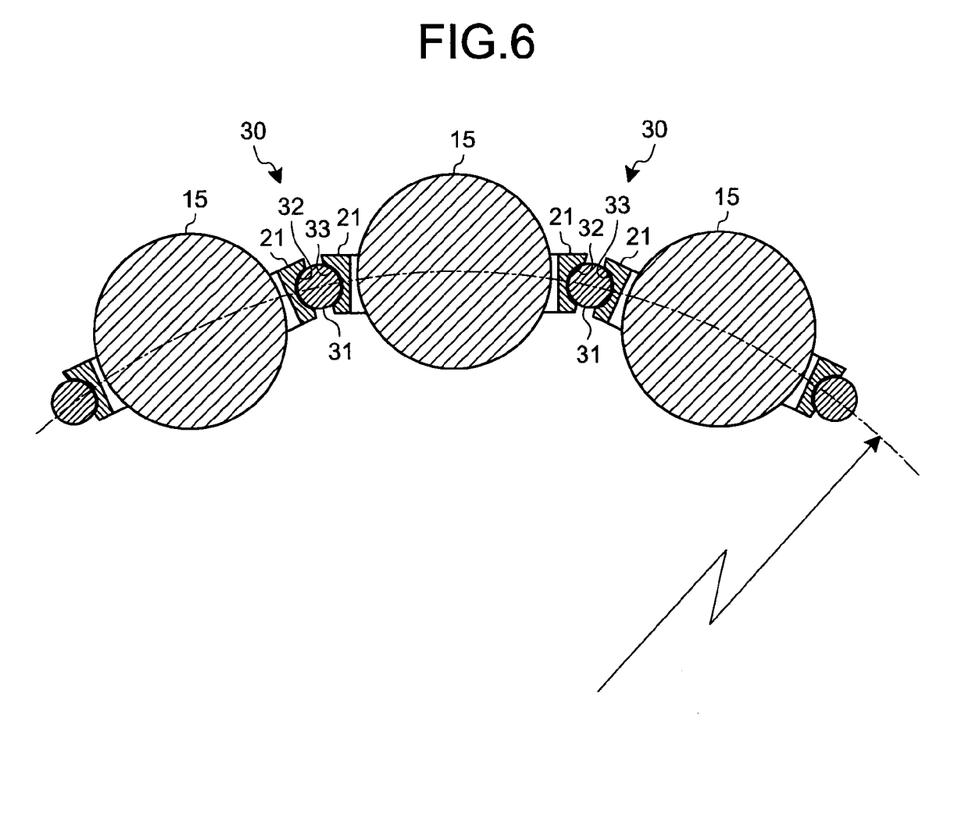
FIG. 6 is a cross-sectional view taken along a line Y-Y of FIG. 1 and illustrating planetary balls and rotation restricting units in a first embodiment.

As shown in FIGS. 5 and 6, each of the rotation restricting units 30 according to the first embodiment includes: a convex curved surface body 31 disposed between adjacent planetary balls 15; first and second holding portions 32 and 33 for holding the convex curved surface body, the first holding portion 32 being provided so as to move integrally with one of a pair of adjacent planetary balls 15 and the second holding portion 33 being provided so as to move integrally with the other one of a pair of adjacent planetary balls 15. The convex curved surface body 31 is held so as to be freely movable between the first and second holding portions 32 and 33 for the convex curved surface body and along both the respective curved surfaces of the holding portions.

As the convex curved surface body 31, a spherical body is used, for example. In this case, it is preferable that the convex curved surface body 31 be perfectly spherical. However, any convex curved surface body 31 may be used as long as it has a convex curved surface (e.g., a spherical surface) that does not block any movement at least within a range of movement (i.e. the contact area of this convex curved surface body 31 and each of the first and second holding portions 32 and 33 for a convex curved surface body).

On the other hand, each of the first and second holding portions 32 and 33 for a convex curved surface body is provided on a member that, when force is applied to the planetary ball 15 in directions other than the direction of rotation of the planetary ball 15 around its axis, moves integrally with this planetary ball 15. Here, the annular members 21 are present as such a member. Therefore, the first holding portion 32 for a convex curved surface body is provided on the annular member 21 surrounding one of the adjacent planetary balls 15, and the second holding portion 33 for a convex curved surface body is provided on another annular member 21 surrounding the other planetary ball 15. Each of the first and second holding portions 32 and 33 for a convex curved surface body is, for example, a recess formed in the periphery of the corresponding annular member 21, and has a concave curved surface corresponding to the convex curved surface of the convex curved surface body 31.

Additionally, the convex curved surface of the convex curved surface body 31 and the concave curved surface of each of the first and second holding portions 32 and 33 for an convex curved surface body have shapes that do not block any tilting motions of the corresponding planetary ball 15, the annular member 21, and so on when the planetary ball 15 is tilted.

In the rotation restricting unit 30, in order to ensure durability despite its movements, for example, the convex curved surface body 31 is molded from steel and the annular members 21 (the first and second holding portions 32 and 33 for a convex curved surface body) may be molded from spring steel.

In the rotation restricting unit 30, the first and second holding portions 32 and 33 for a convex curved surface body sandwich the convex curved surface body 31. Their concave curved surfaces hold the convex curved surface body 31 such that the convex curved surface body 31 is freely movable.

When spin moments M are generated in adjacent planetary balls 15, force F of one of the spin moments M and force F of the other spin moment M are applied to the convex curved surface body 31 via the first holding portion 32 and the second holding portion 33, respectively, for a convex curved surface body. The forces F are identical in magnitude but act in opposite directions, so that they are mutually nullifying. This takes place between all adjacent planetary balls 15. Therefore, in the continuously variable transmission 10, since rotations by spin moments M in all planetary balls 15 are restricted, the state of being parallel between the sun roller 11 and each planetary ball 15 and between the first and second rings 13 and 14 and each planetary ball 15, that is, the state of being parallel between the rotation center axes R1 and F2, are maintained. Accordingly, in the continuously variable transmission 10, occurrence of thrust force between them is restricted, so that a decrease in torque transmission efficiency can be restricted.

The rotation restricting unit 30 is able to restrict decrease in torque transmission efficiency even when spin moment M is generated. However, it is not necessary significantly to change the number of planetary balls 15 disposed, or spaces between them, and so on, from those in the related art. Also, since each rotation restricting unit 30 is disposed in a conventionally existing space between the adjacent planetary balls 15, restricting decrease in torque transmission efficiency can be achieved without increasing the size of the continuously variable transmission 10. Also, the rotation restricting unit 30 is able to restrict decrease in torque transmission efficiency without blocking any tilting motions of the planetary balls 15, or the annular members 21, etc. Furthermore, each rotation restricting unit 30 is able to adjust the space between the adjacent annular members 21 by changing the size of the convex curved surface body 31. Accordingly, this enables highly accurate management of the spaces for the planetary balls 15 radially arranged, substantially at regular intervals.

Here, as shown in FIG. 6, it is preferable to arrange the convex curved surface bodies 31 such that the centers of gravity of the convex curved surface bodies 31 are located on a circle (a circle around the rotation center axis R1) connecting the centers of gravity of all the planetary balls 15. In this case, in order that the first and second holding portions 32 and 33 for a convex curved surface body be provided according to the disposition of the convex curved surface body 31, the shape of the annular members 21 may be determined if necessary. Thus, the planetary balls 15, etc., are able to tilt more smoothly. In addition, when spin moment M is generated, each convex curved surface body 31 is less susceptible to force applied by moment other than this spin moment M. Accordingly, separation of the convex curved surface body 31 from the first and second holding portions 32 and 33 for convex curved surface body is easily avoided.

Each of the first and second holding portions 32 and 33 for a convex curved surface body is obtained by forming a recess in the periphery of the corresponding annular member 21. However, each may be formed, for example, on a projection portion jutting out from the periphery of the annular member 21.

Second Embodiment

A second embodiment of a power transmission device according to the present invention will be described based on FIG. 7. In the second embodiment also, a description is given using a continuously variable transmission as an example of the power transmission device.

A continuously variable transmission 10 in the second embodiment is one in which the rotation restricting unit 30 in the first embodiment is modified to another form.

For example, the rotation restricting units 30 in the first embodiment require the convex curved surface bodies 31, which are additional components, compared to conventional continuously variable transmission that has portions corresponding to the annular members 21. As a result, the possibility of a cost increase arises. Therefore, in order to restrict cost increases, in the continuously variable transmission 10 in the second embodiment, the rotation restricting units 30 are replaced by rotation restricting units 130 shown in FIG. 7.

Each rotation restricting unit 130 includes: a convex curved surface portion 131 provided so as to move integrally with one of the adjacent planetary balls 15; and a concave curved surface portion 132 provided so as to move integrally with the other planetary ball 15 and having a concave curved surface that is engaged with the convex curved surface of the convex curved surface portion 131 such that the convex curved surface is freely movable along the concave curved surface.

As a convex curved surface portion 131, one obtained by spherical molding may be used. In this case, it is preferable that the convex curved surface portion 131 be perfectly spherical. However, any convex curved surface portion 131 may be used as long as it has a convex curved surface (e.g., a spherical surface) that does not block any movement at least within a range of movement (i.e., the contact area of this convex curved surface portion 131 and the concave curved surface portion 132). The convex curved surface portion 131 with such an external shape is provided on a member that, when force is applied to the planetary ball 15 in directions other than the direction of rotation of the planetary ball 15 around its axis, moves integrally with this planetary ball 15. Here, the annular members 21 perform the function of such members. Therefore, the convex curved surface portion 131 is formed by projecting from the annular member 21 surrounding one of the pair of adjacent planetary balls 15. That is, this convex curved surface portion 131 is like one obtained by integrating a convex curved surface body 31 with one annular member 21 in the first embodiment. Therefore, the rotation restricting units 130 can restrict costs, compared to the ones in the first embodiment, which have the convex curved surface bodies 31 as separate members.

On the other hand, the concave curved surface portion 132 has a concave curved surface corresponding to the convex curved surface of the convex curved surface portion 131. As with the convex curved surface portion 131, the concave curved surface portion 132 is also provided on a member (an annular member 21 in this embodiment) that, when force is applied to the planetary ball 15 in directions other than the direction of rotation of the planetary ball 15 around its axis, moves integrally with this planetary ball 15. That is, this concave curved surface portion 132 is a recess formed in the periphery of the annular member 21 or a recess formed in a portion jutting out from this periphery, and performs a role equivalent to that of each of the first and second holding portions 32 and 33 for the convex curved surface body in the first embodiment.

In this rotation restricting unit 130 also, the convex curved surface of the convex curved surface portion 131 and the concave curved surface of the concave curved surface portion 132 have respective curved shapes that do not block any tilting motions of the planetary balls 15 and so on. This rotation restricting unit 130 may be molded from, for example, spring steel or the like in order to improve its durability.

In the case of such a rotation restricting unit 130, when spin moments M are respectively generated in the adjacent planetary balls 15, force F generated by one of a pair of spin moments M is applied to the annular member 21, serving as the base portion of the convex curved surface portion 131, and consequently to the convex curved surface portion 131; also, force F generated by the other one of a pair of spin moments M is applied to this convex curved surface portion 131 via the concave curved surface portion 132.

Accordingly, as in the first embodiment, these rotation restricting units 130 are able to restrict decrease in torque transmission efficiency at the time of the generation of spin moments M without blocking any tilting motions of the planetary balls 15 or so on, and without increasing the size of the continuously variable transmission 10. Additionally, by changing the size of the convex curved surface portion 131, this rotation restricting unit 130 enables highly accurate management of spaces for the corresponding planetary balls 15, as in the first embodiment. In addition, the rotation restricting units 130 in the second embodiment can achieve these advantageous effects at low cost. Furthermore, since each of these rotation restricting units 130 can eliminate one component (the convex curved surface body 31) from the first embodiment, workability for the assembly of the continuously variable transmission 10 is improved.

Figure 7:
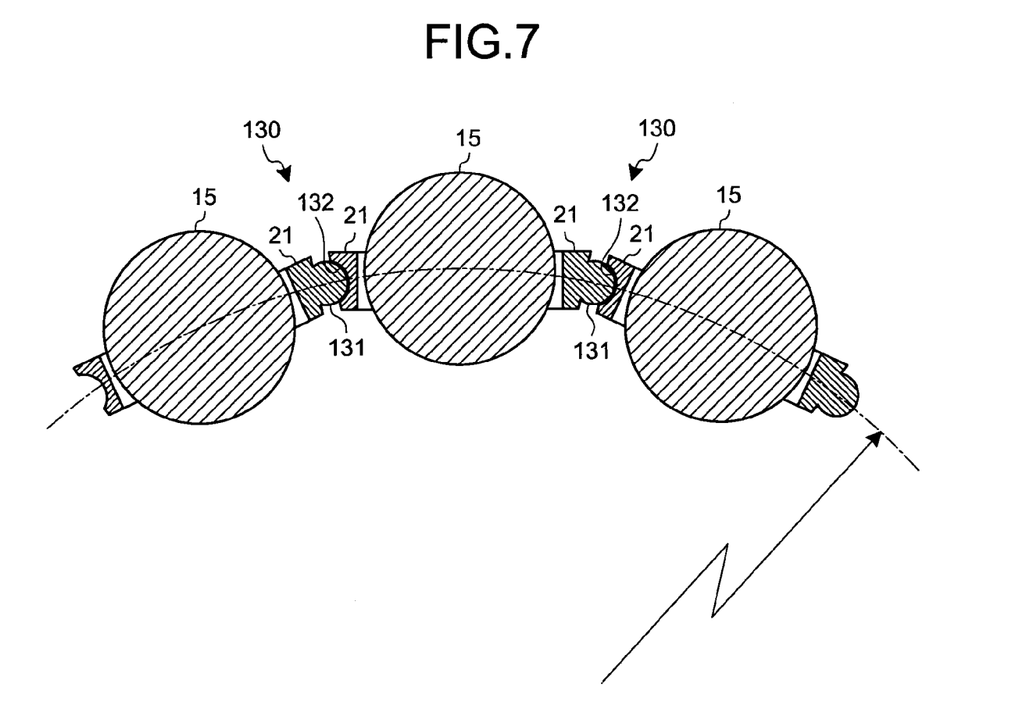
FIG. 7 is a cross-sectional view taken along a line Y-Y of FIG. 1 and illustrating planetary balls and rotation restricting units in a second embodiment.

Here, as shown in FIG. 7, it is preferable to arrange the convex curved surface portion 131 such that the centers of gravity of the convex curved surface portions 131 are located on a circle (a circle around the rotation center axis R1) connecting the centers of gravity of all the planetary balls 15. Accordingly, the tilting motions of the planetary balls 15 and so on are smoothed, and separation of the convex curved surface portions 131 from their corresponding concave curved surface portions 132 is easily avoided.

Each of the concave curved surface portions 132 is obtained by forming a recess in the periphery of the corresponding annular member 21. However, each may be formed, for example, on a projection jutting out from the periphery of the annular member 21.

Each one annular member 21 may be provided with one convex curved surface portion 131 and one concave curved surface portion 132 or may be provided with two convex curved surface portions 131 or two concave curved surface portions 132. Since the annular members 21 all of which are identical in shape can be used, the former is preferable in terms of cost reduction.

Third Embodiment

A third embodiment of the power transmission device according to the present invention will be described based on FIG. 8. In the third embodiment also, a description is given using a continuously variable transmission as an example of a power transmission device.

A continuously variable transmission 10 in the third embodiment is one in which the rotation restricting unit 30 in the first embodiment and the rotation restricting unit 130 in the second embodiment are modified to another form.

In the continuously variable transmission 10, if excessive torque is input, this is transmitted to the annular members 21 via the planetary balls 15 and so on, resulting in elastic deformation of the annular members 21. In the rotation restricting units 30 and 130 in the first and second embodiments respectively, when the annular members 21 are elastically deformed, spaces between adjacent annular members 21 may be changed. In particular, when the space between the annular members 21 widens, displacement or separation may occur in the joint portion. Therefore, in the continuously variable transmission 10 according to the third embodiment, a rotation restricting unit 230 as shown in FIG. 8 is used in place of the rotation restricting unit 30 or 130.

The rotation restricting unit 230 is a universal joint (a so-called universal joint structure) that allows the angle of a joint portion to be freely changed. This rotation restricting unit 230 includes: first and second engagement portions 231 and 232, and a coupling portion 233 provided to freely change a joint angle between the first and second engagement portions 231 and 232. Each of the first and second engagement portions 231 and 232 is provided on a member that, when force is applied to a planetary ball 15 in directions other than the direction of rotation of the planetary ball 15 around its axis, moves integrally with this planetary ball 15. For example, as in the first and second embodiments, this rotation restricting unit 230 is configured such that the first engagement portion 231 is provided so as to be movable integrally with one of a pair of annular members 21, which member is provided around one of the adjacent planetary balls 15, whereas the second engagement portion 232 is provided so as to be movable integrally with the other one of a pair of annular members 21, which member is provided around the other planetary ball 15.

Accordingly, each of rotation restricting units 230 not only yields advantageous effects similar to those in the rotation restricting units 30 and 130 in the first and second embodiments respectively, but also yields the further advantageous effect that even if the adjacent annular members 21 are subject to force that leads to change in the space between them, displacement or separation are prevented from occurring in the joint portion. In particular, even in a continuously variable transmission 10 where the curvature of each joint portion is large because of, for example, substantially fewer planetary balls 15, this rotation restricting unit 230 is able to avoid displacement or separation in the joint portion.

Figure 8:
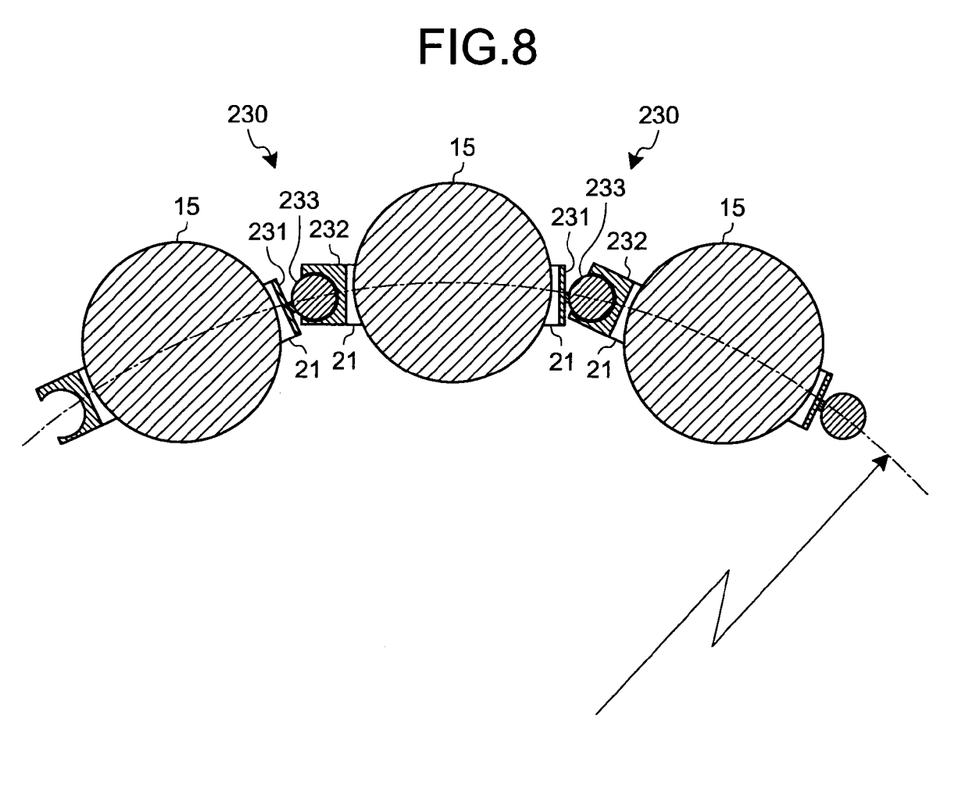
FIG. 8 is a cross-sectional view taken along a line Y-Y of FIG. 1 and illustrating planetary balls and rotation restricting units in a third embodiment.

Here, as shown in FIG. 8, it is preferable that the movable center between the first and second engagement portions 231 and 232 of each of the rotation restricting units 230 be located on a circle (a circle around the rotation center axis R1) connecting the centers of gravity of all the planetary balls 15. Accordingly, the tilting motions of the planetary balls 15 and so on are smoothed.

In each of the first to third embodiments described above, the continuously variable transmission 10 is used as an example of a power transmission device. However, the rotation restricting units 30, 130, and 230 in the corresponding first to third embodiments are able to obtain the foregoing actions and advantageous effects by their being applied in a power transmission device that has at least the configuration described below. The configuration includes: two rotating elements arranged opposite each other, having a common rotation center axis, and rotatable relative to each other; a plurality of rolling members having rotation center axes parallel to and different from the common rotation center axis and radially arranged between the rotating elements and around the rotation center axis of the rotating elements; and a transmission control unit configured to change a rotation ratio between the rotating elements by changing the contact point of one of the rotating elements and each rolling member and the contact point of other one of the rotating elements and each rolling member through tilting motions of the rolling members. Where this configuration is applied in the continuously variable transmission 10, the rotating elements are respectively the first and second rings 13 and 14, and the rolling members are planetary balls 15.

In each of the foregoing first to third embodiments, a description was given using an example where spin moments M are generated as a result of the positional relation of the respective contact areas of the first and second rings 13 and 14 and the planetary balls 15. The rotation restricting units 30, 130, and 230 are not limited to this example, but can obtain advantageous effects similar to those described above even in any situation where spin moments M are generated in the planetary balls 15.

INDUSTRIAL APPLICABILITY

As described above, power transmission devices according to the present invention are useful for a technique that restricts decrease in torque transmission efficiency.

REFERENCE SIGNS LIST

10 CONTINUOUSLY VARIABLE TRANSMISSION
11 SUN ROLLER (FIRST ROTATING ELEMENT)
12 CARRIER (SECOND ROTATING ELEMENT)
13 FIRST RING (THIRD ROTATING ELEMENT)
14 SECOND RING (FOURTH ROTATING ELEMENT)
15 PLANETARY BALL (FIFTH ROTATING ELEMENT, ROLLING MEMBER)
16 SUPPORT SHAFT
17 TRANSMISSION CONTROL UNIT
18 GUIDE MEMBER
19, 20 FIRST AND SECOND GUIDE PORTION
21 ANNULAR MEMBER
30 ROTATION RESTRICTING UNIT
31 CONVEX CURVED SURFACE BODY
32 FIRST HOLDING PORTION FOR CONVEX CURVED SURFACE BODY
33 SECOND HOLDING PORTION FOR CONVEX CURVED SURFACE BODY
130 ROTATION RESTRICTING UNIT
131 CONVEX CURVED SURFACE PORTION
132 CONCAVE CURVED SURFACE PORTION
230 ROTATION RESTRICTING UNIT
231 FIRST ENGAGEMENT PORTION
232 SECOND ENGAGEMENT PORTION
233 COUPLING PORTION
R1, R2 ROTATION CENTER SHAFT

The invention claimed is:

1. A power transmission device, comprising:
two rotating elements arranged opposite each other, having a common rotation center axis, and rotatable relative to each other;
a plurality of rolling members having rotation center axes parallel to and different from the rotation center axis, and radially arranged between the rotating elements and around the rotation center axis of the rotating elements;
a transmission control unit configured to change a rotation ratio between the rotating elements by changing a contact point of one of the rotating elements and each of the rolling members and a contact point of the other one of the rotating elements and each of the rolling members through tilting motion of each of the rolling members;
an annular member disposed around each of the rolling members such that when a spin moment is generated in the rolling member in directions other than the direction of rotation of the rolling member around its axis and the direction of rotation of the rolling member during tilting, the annular member is rotatable integrally with the rolling member in the direction of the spin moment; and
a rotation restricting unit disposed between the annular members surrounding the rolling members adjacent to each other, and configured such that at least part of the spin moment generated in each of the rolling members is offset via the adjacent annular members, thereby restricting rotation of the rolling members generated by the spin moment, wherein
the rotation restricting unit includes a convex curved surface body arranged between the adjacent annular members, a first holding portion for the convex curved surface body and a second holding portion for the convex curved surface body, the first holding portion being provided so as to move integrally with one of the rolling members and the second holding portion being provided so as to move integrally with the other one of the rolling members, and
the first holding portion and the second holding portion respectively have concave curved surfaces, between which the convex curved surface body is sandwiched so as to be freely moved along both the curved surfaces.

2. The power transmission device according to claim 1, further comprising:
a third rotating element capable of rotating relative to each of the rotating elements on the common rotation center axis to the two rotating elements; and
a fourth rotating element capable of rotating relative to each of the rotating elements on the common rotation center axis to the three rotating elements and capable of rotating each of the rolling members around the rotation center axis of each of the rotating elements, wherein
each of the rolling members is arranged on the peripheral surface of the third rotating element.

3. A power transmission device, comprising:
two rotating elements arranged opposite each other, having a common rotation center axis, and rotatable relative to each other;
a plurality of rolling members having rotation center axes parallel to and different from the rotation center axis, and radially arranged between the rotating elements and around the rotation center axis of the rotating elements;
a transmission control unit configured to change a rotation ratio between the rotating elements by changing a contact point of one of the rotating elements and each of the rolling members and a contact point of the other one of the rotating elements and each of the rolling members through tilting motion of each of the rolling members;
an annular member disposed around each of the rolling members such that when a spin moment is generated in the rolling member in directions other than the direction of rotation of the rolling member around its axis and the direction of rotation of the rolling member during tilting, the annular member is rotatable integrally with the rolling member in the direction of the spin moment;
a rotation restricting unit disposed between the annular members surrounding the rolling members adjacent to each other, and configured such that at least part of the spin moment generated in each of the rolling members is offset via the adjacent annular members, thereby restricting rotation of the rolling members generated by the spin moment;

a third rotating element capable of rotating relative to each of the rotating elements on the common rotation center axis to the two rotating elements; and a fourth rotating element capable of rotating relative to each of the rotating elements on the common rotation center axis to the three rotating elements and capable of rotating each of the rolling members around the rotation center axis of each of the rotating elements, wherein each of the rolling members is arranged on the peripheral surface of the third rotating element, the rotation restricting unit includes a convex curved surface body arranged between the adjacent annular members, a first holding portion for the convex curved surface body and a second holding portion for the convex curved surface body, the first holding portion being provided so as to move integrally with one of the rolling members and the second holding portion being provided so as to move integrally with the other one of the rolling members, and the first holding portion and the second holding portion respectively have concave curved surfaces, between which the convex curved surface body is sandwiched so as to be freely moved along both the curved surfaces.

* * * * *